No. 865,115. PATENTED SEPT. 3, 1907.
E. D. MARKHAM.
WHEEL.
APPLICATION FILED SEPT. 17, 1906.
2 SHEETS—SHEET 1.
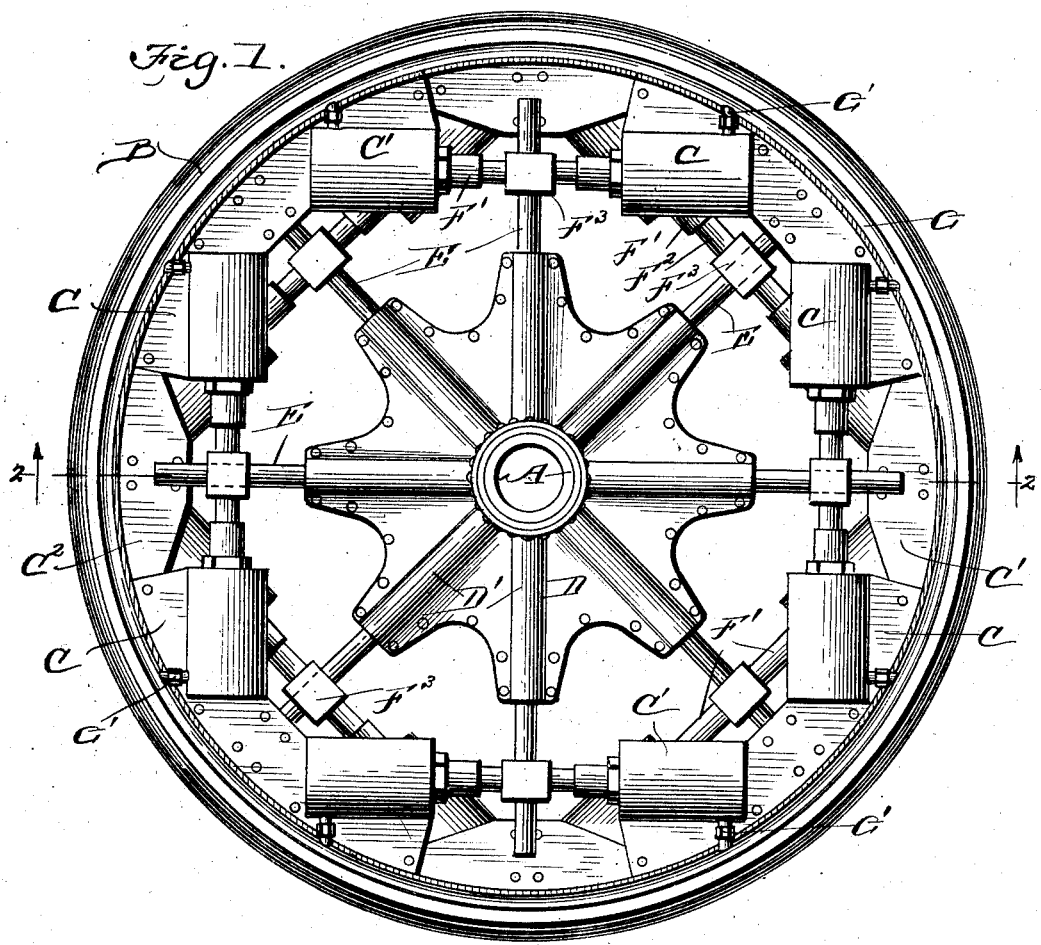
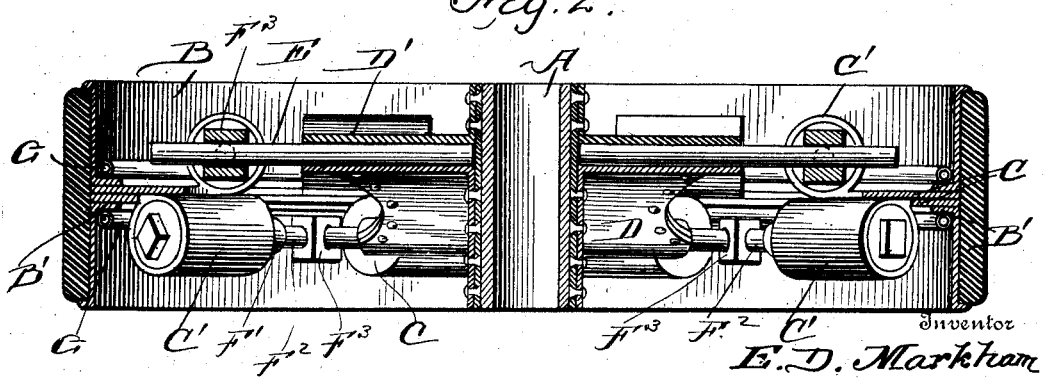

No. 865,115. PATENTED SEPT. 3, 1907.
E. D. MARKHAM.
WHEEL.
APPLICATION FILED SEPT. 17, 1906.

2 SHEETS—SHEET 2.

Witnesses

Inventor
E. D. Markham
By O'Meara & Brock
Attorneys

UNITED STATES PATENT OFFICE.

EDWARD D. MARKHAM, OF CHICAGO, ILLINOIS.

WHEEL.

No. 865,115.

Specification of Letters Patent.

Patented Sept. 3, 1907.

Application filed September 17, 1906. Serial No. 334,907.

*To all whom it may concern.*

Be it known that I, EDWARD D. MARKHAM, a citizen of the United States, residing at Chicago, in the county of Cook and State of Illinois, have invented a new and useful Improvement in Wheels, of which the following is a specification.

This invention relates to a pneumatic wheel in which the weight of the vehicle and load is borne by compressed air contained in a number of cylinders carried by the rim of the wheel, the spokes not being connected to said rim.

The object of the invention is a wheel in which all jars and vibrations incidental to the rough roads will be taken up by compressed air.

The invention consists of a wheel having a plurality of cylinders arranged in pairs carried thereby, pistons in the cylinders, piston rods connecting the cylinders of each pair and spokes rigidly secured to the hub and loosely connected to the piston rods and at right angles to said rods.

Figure 3:
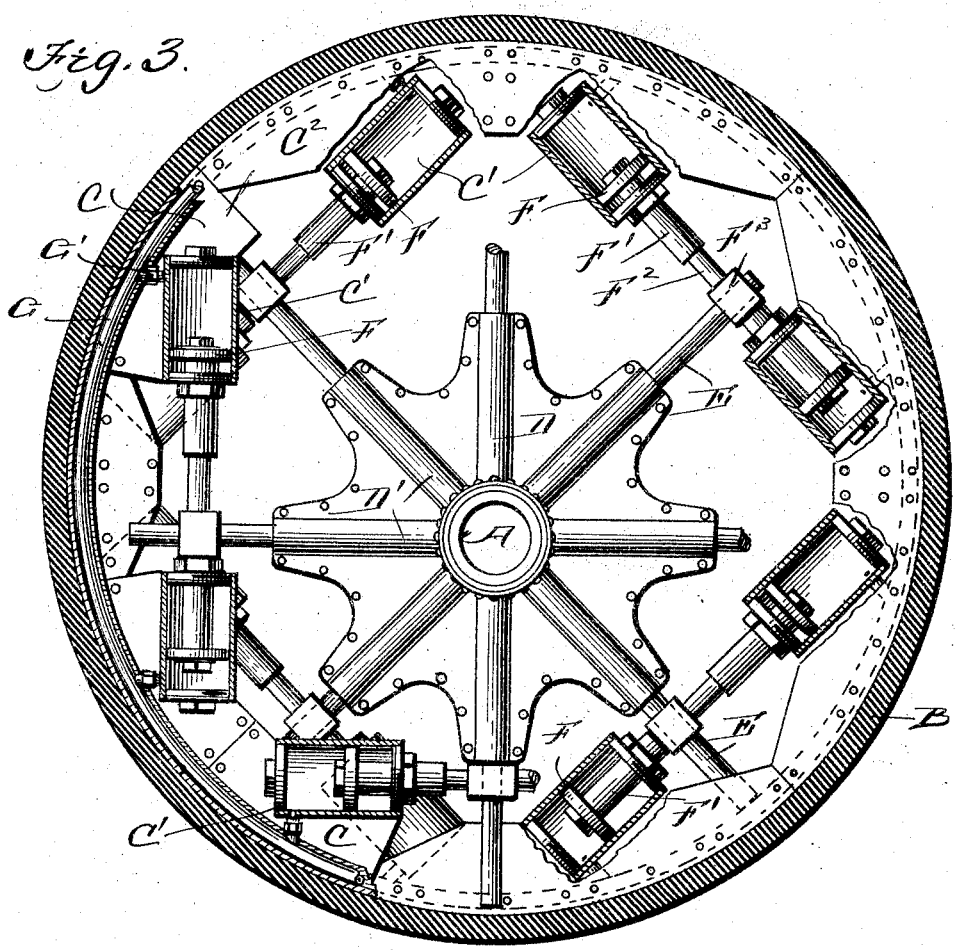
Figure 4:
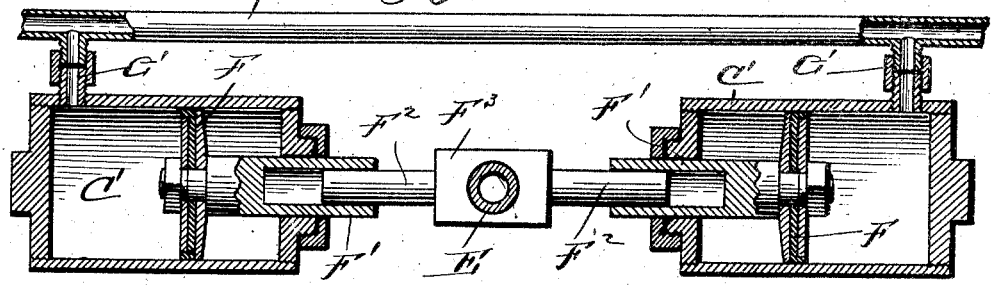

In the accompanying drawings, Figure 1 is a side elevation of a wheel, the parts being in a balanced position. Fig. 2 is a section on the line 2—2 of Fig. 1. Fig. 3 is a side elevation of the wheel, portions being broken away and parts being shown in section, the parts being in the position assumed when loaded to capacity. Fig. 4 is a longitudinal section through a pair of cylinders, and connected parts.

In constructing my wheel I employ a hub A and a rim B and the hub A is not connected directly to the rim and is movable in a radial line with respect to the rim as will be shown in Figs. 1 and 3, in Fig. 1 the hub being shown concentric with the rim B and in Fig. 3 the hub is shown as arranged eccentrically with respect to the said rim, the hub having free play between the positions shown in these figures.

The rim may be of any desired type and may or may not be cushioned with rubber or provided with any other suitable form of tire. To the insides of the rim which I prefer to form in two parallel sections flanged upon their adjacent edges are connected plates C which as shown in Fig. 2 are placed side by side and held between the flanges B' of the rim B. These plates C are bent or curved to form cylinders C' which are arranged in pairs the cylinders of each pair being in alinement with each other and each pair being at right angles to the adjacent pairs. Upon the hub A are riveted two plates D of sheet pressed steel which are pressed outwardly at regular intervals as shown at D' and these plates are riveted or bolted together, the outwardly pressed portions of each plate alining and forming radial sockets in which are secured the inner end portions of spokes E which spokes may or may not be riveted to the plates D. In the cylinders C' are placed pistons F which are provided with hollow piston rods F'. Supplemental piston rods F² have their end portions working in alining piston rods F² and each piston rod F² carries midway between its ends a block or enlargement F³ in which is formed a transverse opening through which loosely works one of the spokes E. The pipe G in the form of a tubular ring is carried by the wheel and communciates by branches G' with each cylinder C.

The operation of the wheel and the object of these parts is as follows:—Compressed air is forced into the pipe G at any suitable point and passes into the cylinders C until the pistons F are in the position shown in Fig. 4 throwing the spokes E midway between the cylinders and as the vehicle is rotated the weight will be carried mainly by the two horizontal spokes and partially by the obliquely inclined spokes, no load being carried by the spokes which are in a vertical position. As the load increases the hub A will gradually drop below the center of the rim B, and the pistons F in the lower vertically extending cylinders will also descend as will the pistons F in the cylinders arranged obliquely and it will be obvious that the weight will be borne by the compressed air in the said cylinders which will act as a cushion to take up any jars caused by uneven road surfaces. It will also be obvious that as the wheel rotates the load will be continuously shifted from one pair of cylinders to another and that in all cases the weight of the load will rest upon the horizontal spokes and parts connected thereto and not upon the vertical spokes which are out of contact with the rim, and that consequently while the portion of the rim in contact with the uneven surface is the part of the wheel which sustains the jar or jolt, the support of the vehicle and the load is carried entirely by parts distant from said portion of the rim and not in contact with the ground.

Having thus fully described my invention, what I claim as new and desire to secure by Letters Patent is:—

1. A wheel comprising a hub, a rim, spokes secured to the hub and out of engagement with the rim, cylinders carried by the rim, pistons therein and piston rods connected to said pistons, the free ends of the spokes being loosely connected to said rods.

2. A wheel of the kind described comprising a plurality of cylinders arranged in pairs equi-distant apart, a piston in each cylinder, a piston rod connecting the pistons of each pair of cylinders, a hub, spokes carried by the hub, and a rim supporting the cylinders, the spokes passing loosely through the said piston rods.

3. A wheel comprising a rim, cylinders arranged in pairs carried by said rim, the cylinders of each pair being arranged at an angle to adjacent pairs, means for admitting a fluid under pressure to said cylinders, pistons in the cylinders, piston rods connecting cylinders of a pair, a hub, and spokes carried by said hub and terminating short of the rim, said spokes working loosely through and at right angles to said pistons.

4. A rim having a plurality of pairs of cylinders carried thereby, said cylinders of each pair being in alinement means for simultaneously admitting compressed air to all of the cylinders, pistons in said cylinders, a common piston rod for the piston of each pair of cylinders, a hub movable radially with respect to the rim and spokes carried by said hub and passing loosely and transversely through the said piston rods.

EDWARD D. MARKHAM.

Witnesses:
W. S. UFHEIL,
CHARLES LUPMAN.